(12) United States Patent
Hosono et al.

(10) Patent No.: US 7,697,936 B2
(45) Date of Patent: Apr. 13, 2010

(54) BASE STATION APPARATUS, MOBILE STATION APPARATUS, AND RADIO COMMUNICATION PARAMETER UPDATING METHOD

(75) Inventors: Hiroyuki Hosono, Yokohama (JP);
Shinichi Mori, Yokosuka (JP);
Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 338 days.

(21) Appl. No.: 11/546,414

(22) Filed: Oct. 12, 2006

(65) Prior Publication Data
US 2007/0093268 A1 Apr. 26, 2007

(30) Foreign Application Priority Data
Oct. 20, 2005 (JP) ............................. 2005-305240

(51) Int. Cl.
*H04W 40/00* (2009.01)
*H04W 72/00* (2009.01)
*H04W 4/00* (2009.01)
*H04B 1/38* (2006.01)
*H04B 7/216* (2006.01)
(52) U.S. Cl. .................... 455/446; 455/450; 455/452.2; 455/561; 370/329; 370/342
(58) Field of Classification Search ................. 370/320, 370/328, 329, 342, 332–335; 455/423–425, 455/446–449, 450–453, 561
See application file for complete search history.

(56) References Cited

U.S. PATENT DOCUMENTS

| 6,128,288 | A  | * | 10/2000 | Miya ........................... 370/335 |
| 6,496,700 | B1 | * | 12/2002 | Chawla et al. ........... 455/435.2 |
| 7,130,638 | B2 |   | 10/2006 | Chen et al. |

FOREIGN PATENT DOCUMENTS

| CN | 1360446 | 7/2002 |
| JP | 2001-54158 A | 2/2001 |

OTHER PUBLICATIONS

Location-Based Associativity routing for MANET, Sastry et. al. Wireless and Mobile Computing, Networking and Communications, 2005. (WiMob'2005), IEEE International Conference on vol. 3, Aug. 22-24, 2005 p. 49-56.*

(Continued)

*Primary Examiner*—George Eng
*Assistant Examiner*—Nam Huynh
(74) *Attorney, Agent, or Firm*—Crowell & Moring LLP

(57) ABSTRACT

To provide a base station apparatus that can automatically update the parameters required for radio communication. A pair of identifier for identifying the self station and radio communication parameter is notified to another base station existing in the neighborhood of the self station, and the path loss value between another base station and a mobile station and the pair of identifier and radio communication parameter for another base station is acquired. The pair of identifier and radio communication parameter reported by the self station is set and updated, based on this acquired information. Since it is updated in consideration of the path loss value reported from the mobile station, the parameter can be updated at higher precision.

11 Claims, 7 Drawing Sheets

OTHER PUBLICATIONS

A Power Control MAC Protocol for Ad Hoc Networks, Jung et. al. Wireless Networks, Springer Netherlands, vol. 11, Nos. 1-2 / Jan. 2005, pp. 55-66.*

An Accurate Line of Sight Propagation Performance Model for Ad-Hoc 802.11 Wirless LAN (WLAN) Devices. Green et. al. Communications, 2002. ICC 2002. IEEE International Conference on vol. 5, Apr. 28-May 2, 2002 pp. 3424-3428.*

Chinese Office Action dated Nov. 21, 2008 with English translation.

* cited by examiner

BASE STATION APPARATUS, MOBILE STATION APPARATUS, AND RADIO COMMUNICATION PARAMETER UPDATING METHOD

BACKGROUND OF THE INVENTION

1. Field of the Invention

The present invention relates to a base station apparatus, a mobile station apparatus, and a method for updating the radio communication parameters, and particularly to a base station apparatus of multiple access method in which a plurality of users make the communications at the same time by sharing a radio channel, a mobile station apparatus, and a method for updating the temporary radio communication parameters.

2. Description of the Related Art

As the multiple access methods in which a plurality of users make the communications by sharing a radio channel, a code division multiple access (CDMA), a time division multiple access (TDMA) and a frequency division multiple access (FDMA) are well known.

For example, in a communication system of code division multiple access method in which the same frequency band is shared among a plurality of communication waves, individual communication waves are distinguished by the spreading codes of random code series. As the spreading code is better in the detection characteristic (auto-correlation characteristic) and the identification characteristic (cross-correlation characteristic) between different spreading codes, the system efficiency is improved. Therefore, all the random combinations of codes determined by the series length are not employed, but the code series to attain the required characteristics are selectively employed. Accordingly, when the high system efficiency is required, the spreading code is limited and the assignable number of spreading codes is below the total number of simultaneous communication waves supposed for the system.

Particularly in the satellite downlink of a W-CDMA (Wideband CDMA) cellular system, the spreading code used is demanded to have the code orthogonality capable of reducing mutual interference between different spreading codes, in addition to the high detection characteristic and identification characteristic, to implement high quality communications even at low transmission power. Therefore, the assignable number of spreading codes is smaller than in the satellite uplink. This small number of spreading codes is repeatedly employed for effective use, but a different code for each cell is employed and superimposed to prevent radio interference between cells.

In the W-CDMA cellular system, the spreading code for actually spreading the user data in the broadband is called a channelization code, and the code for preventing radio interference between cells superimposed for each cell is called a scrambling code.

Each base station apparatus (hereinafter simply referred to as a base station) forming each cell of the W-CDMA cellular system reports the down scrambling code employed by its peripheral base station on the control channel so that a mobile station apparatus (hereinafter simply referred to as a mobile station) may detect the cell at high speed, and the mobile station makes the reception of the satellite downlink for the scrambling code notified on the control channel. Accordingly, when the down scrambling code is assigned to a certain base station, in order to enable the mobile station to make the reception on the satellite downlink of the base station, and then make the reception on another satellite downlink around the satellite downlink, it is required that the down scrambling code of the peripheral base station located around the base station is set on the control channel of the base station and reported to the mobile station belonging to the cell formed by the base station.

A technique in which the mobile station acquires the information of the base station and reports it to the base station to which the self station is connected, and the bases station update the information was described in JP2001-54158A.

SUMMARY OF THE INVENTION

In the case where the update method of base station information as described in the JP2001-54158A is adopted, the radio communication parameter such as scrambling code employed by the base station can not be automatically set up at high precision, because the path loss between the base station and the mobile station is not taken into consideration.

This invention has been achieved to solve the above-mentioned problem associated with the prior art, and it is an object of the invention to provide a base station apparatus, a mobile station apparatus and a radio communication parameter update method in which the radio communication parameter employed by the peripheral base station can be automatically set up as the parameter reported by the self base station at high precision.

According to claim 1 of the invention, there is provided a base station apparatus comprising radio communication parameter notification means (corresponding to a base station identifier and scrambling code notification part 108 and a transmitting part 102 in FIG. 3 as will be described later) for notifying a pair of identifier for identifying a self station and radio communication parameter to another base station in the neighborhood of the self station, information acquisition means (corresponding to a receiving part 104 in FIG. 3 as will be described later) for acquiring at least one of a path loss value between another base station and a mobile station, a reception level and an arrival time difference between control channels, and the pair of identifier and radio communication parameter for another base station, and radio communication report parameter update means (corresponding to a base station identifier and scrambling code setting part 106 and a base station identifier and scrambling code report update part 110 in FIG. 3 as will be described later) for setting and updating the pair of identifier and radio communication parameter reported by the self station, based on the information acquired by the information acquisition means. This claim 1 is concerned with a newly established base station 1004 as will be described later. With this constitution, the parameter can be updated, based on the path loss measured value and the radio communication parameter for the peripheral base station, and therefore updated at higher precision.

According to claim 2 of the invention, there is provided the base station apparatus according to claim 1, wherein the radio communication report parameter update means sets the pair of identifier and radio communication parameter for the base station having a smaller preset path loss value as the preferentially reported pair, in which if the path loss value is equal, the pair having a greater number of appearances is set as the preferentially reported pair. The claim 2 is concerned with a newly established base station 1004 as will be described later. With this constitution, the parameter can be updated at high precision, based on the path loss measured value and the radio communication parameter, and appropriately updated based on the number of appearances, even if the path, loss value is equal.

According to claim 3 of the invention, there is provided the base station apparatus according to claim 1, wherein the radio communication report parameter update means sets the pair of identifier and radio communication parameter for the base station having a greater preset number of appearances as the preferentially reported pair, in which if the number of appearances is equal, the pair having a smaller preset path loss value is set as the preferentially reported pair. The claim 3 is concerned with a newly established base station 1004 as will be described later. With this constitution, the parameter can be updated at high precision, based on the path loss measured value and the radio communication parameter, and appropriately updated based on the path loss value, even if the number of appearances is equal.

According to claim 4 of the invention, there is provided a base station apparatus comprising information acquisition means (corresponding to a receiving part 104 in FIG. 3 as will be described later) for acquiring a pair of identifier for identifying a base station and radio communication parameter from a newly established base station that is newly provided, and radio communication parameter report means (corresponding to a base station identifier and scrambling code setting part 106 and a transmitting part 102 in FIG. 3 as will be described later) for reporting the information acquired by the information acquisition means together with the pair of identifier for identifying the self station and radio communication parameter to a mobile station belonging to a cell formed by the self station. The claim 4 is concerned with the existent base stations 1001 and 1002 as will be described later. With this constitution, by acquiring the path loss value from the mobile station, the parameter can be updated at high precision, based on the path loss value.

According to claim 5 of the invention, there is provided the base station apparatus according to claim 4, further comprising path loss update means (corresponding to a base station identifier and scrambling code setting part 106 and a base station identifier and scrambling code report update part 110 in FIG. 3 as will be described later) for updating the path loss value in the pair of identifier and radio communication parameter based on a measurement report, only if the measurement report including the path loss values in the pairs of identifier and radio communication parameter for the newly established base station and the self station is acquired from the mobile station, and path loss notification means (corresponding to a base station identifier and scrambling code setting part 106 and a transmitting part 102 in FIG. 3 as will be described later) for transmitting the path loss value in the pair of identifier and radio communication parameter reported by the self station to the newly established base station, if the measurement report is acquired. The claim 5 is concerned with the existent base stations 1001 and 1002 as will be described later. With this constitution, the newly established base station acquiring the path loss value can update the parameter at higher precision, based on the path loss value.

According to claim 6 of the invention, there is provided the base station apparatus according to claim 4, further comprising radio communication report parameter notification request means (corresponding to a base station identifier and scrambling code notification part 108 and a transmitting part 102 in FIG. 3 as will be described later) for making a request to the base station to notify all the pairs of identifier and radio communication parameter reported by the base station to the newly established base station, if the path loss values in the pairs of identifier and radio communication parameter for the newly established base station and the base station other than the self station are acquired from the mobile station. The claim 6 is concerned with the existent base stations 1001 and 1002 as will be described later. With this constitution, the pair of identifier and radio communication parameter can be set up more appropriately by taking into consideration the report information of the base station located in the distance from the newly established base station.

According to claim 7 of the invention, there is provided the base station apparatus according to claim 5, wherein the path loss update means makes any one of an average value of measurements of the path loss value and a minimum value of the measurements an update value of the path loss value, if the measurement reports are acquired from a plurality of mobile stations. The claim 7 is concerned with the existent base stations 1001 and 1002 as will be described later. With this constitution, the parameter can be updated at higher precision.

According to claim 8 of the invention, there is provided the base station apparatus according to claim 5, wherein the path loss notification means transmits the path loss value in the pair of identifier and radio communication parameter reported by the self station to the newly established base station, if the measurement reports are acquired from a predetermined number of mobile stations. The claim 8 is concerned with the existent base stations 1001 and 1002 as will be described later. With this constitution, the parameter can be updated at higher precision.

According to claim 9 of the invention, there is provided a base station apparatus comprising radio communication report parameter notification response means (corresponding to a base station identifier and scrambling code setting part 106 and a transmitting part 102 in FIG. 3 as will be described later) for notifying all the pairs of identifier and radio communication parameter reported by the self station to the newly established station, if another base station makes a request for notifying all those pairs to the newly established base station that is newly provided. The claim 9 is concerned with an existent base station 1003 as will be described later. With this constitution, the pair of identifier and radio communication parameter can be set up more appropriately by taking into consideration the report information of the base station located in the distance from the newly established base station.

According to claim 10 of the invention, there is provided a mobile station apparatus comprising path loss measurement means (corresponding to a scrambling code/base station identifier/path loss measurement part 306 in FIG. 6 as will be described later) for measuring the path loss value that is a power difference between the transmission power of a base station to which the self station can be connected and the reception power of the self station, and notification means (corresponding to a scrambling code/base station identifier/path loss measurement part 306 and a transmitting part 302 in FIG. 6 as will be described later) for notifying the path loss value measured by the path loss measurement means to the base station. With this constitution, the path loss value can be acquired on the base station side, and the pair of identifier and radio communication parameter can be set up more appropriately on the base station side.

A radio communication parameter update method according to an embodiment of the invention is provided in a radio communication system wherein a base station and a mobile station belonging to a cell formed by the base station communicate, the base station automatically setting up a parameter required for radio communication and incorporation into a radio access network when newly established, the radio communication parameter update method allowing the newly established base station to report a pair of identifier and radio communication parameter for an existent base station that exists to form a cell adjacent to the cell formed by the newly established base station that is newly provided to the mobile station belonging to the cell formed by the newly established base station, comprising:

a step (corresponding to step S1102 in FIG. 5 as will be described later) at which the newly established base station sets up the pair of base station identifier and radio communication parameter for the self station;

a step (corresponding to steps S1104, S1108 and S1112 in FIG. 5 as will be described later) at which the newly established base station notifies the pair of base station identifier and radio communication parameter for the self station to the first existent base station in the neighborhood;

a step (corresponding to steps S1114 and S1116 in FIG. 5 as will be described later) at which the first existent base station reports the pair of base station identifier and radio communication parameter for the newly established base station, in addition to the pair of base station identifier and radio communication parameter reported to the mobile station belonging to the cell formed by the first existent base station, to the mobile station, based on a notification of the pair of base station identifier and radio communication parameter from the newly established base station;

a step (corresponding to steps S1118 and S1122 in FIG. 5 as will be described later) at which the first existent base station receives a measurement report including the path loss value from the mobile station, the path loss value being a power difference between the transmission power of the base station and the reception power of the mobile station in the pair of identifier and radio communication parameter for the base station to which the mobile station can be connected among all the pairs of identifier and radio communication parameter reported from the first existent base station;

a step (corresponding to steps S1120 and S1124 in FIG. 5 as will be described later) at which the first existent base station updates the hold value of the path loss value in the pair of identifier and radio communication parameter based on a measurement report of the path loss values, only if the measurement report including the path loss values in the pairs of identifier and radio communication parameter for both the newly established base station and the first existent base station is received from the mobile station;

a step (corresponding to steps S1128 and S1130 in FIG. 5 as will be described later) at which the second existent base station notifies the hold value of the path loss value to the newly established base station, the path loss value being in each of the pairs of identifier and radio communication parameter reported in the second existent base station receiving the measurement report including the path loss values in the pairs of identifier and radio communication parameter for both the self station and the newly established base station from the mobile station among the first base stations;

a step (corresponding to step S1126 in FIG. 5 as will be described later) at which the second existent base station makes a request to the third existent base station to notify all the pairs of identifier and radio communication parameter reported by the third existent base station to the newly established base station, if a measurement report of the path loss values in the pairs of identifier and radio communication parameter for the third existent base station in addition to the newly established base station and the second existent base station is notified from the mobile station to the second existent base station;

a step (corresponding to step S1132 in FIG. 5 as will be described later) at which the third existent base station notifies all the pairs of identifier and radio communication parameter reported by the third existent base station to the newly established base station based on the request; and a step (corresponding to step S1134 in FIG. 5 as will be described later) at which the newly established base station updates the pair of identifier and radio communication parameter reported by the newly established base station, based on all the identifiers notified from the second existent base station, the path loss hold value in the radio communication parameter, all the identifiers notified from the third existent base station and the radio communication parameter. With this constitution, the parameter can be updated at higher precision. Whether or not the base stations are located in the neighborhood is determined based on the path length between the base stations.

As described above, the invention has the effect that the pair of base station identifier and radio communication parameter, which the base station should report to the mobile station belonging to the cell formed by the base station, can be automatically set up at higher precision, based on the path loss measured value and the reporting radio communication parameter for the peripheral base station.

DETAILED DESCRIPTION OF THE PREFERRED EMBODIMENTS

Figure 1A:
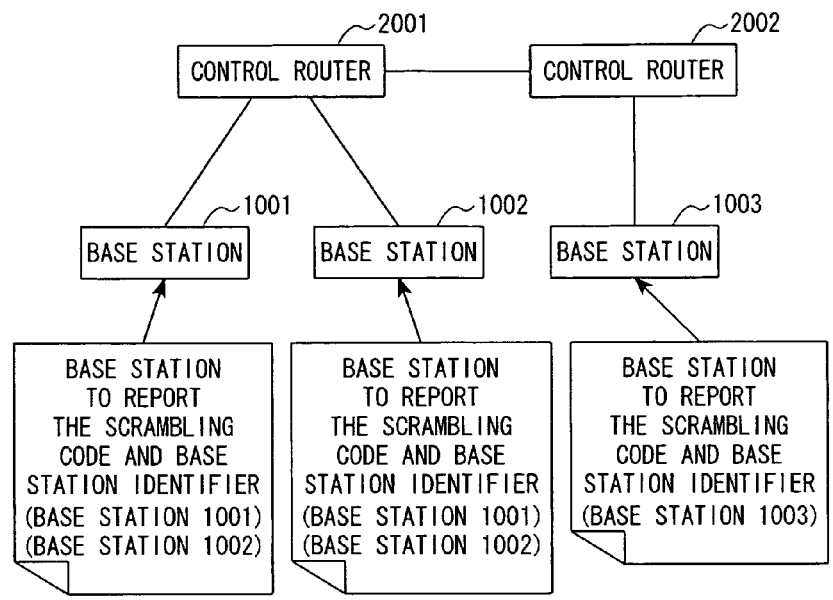
FIGS. 1A and 1B are explanatory views showing the configuration of a radio access network in newly establishing a base station according to an embodiment of the invention.

The preferred embodiments of the present invention will be described below with reference to the drawings. In the following explanation, the parts having the same functions are designated by the same reference numerals or signs throughout the drawings, and the repeated explanation is omitted.

(Configuration Example of Radio Access Network)

Figure 1B:
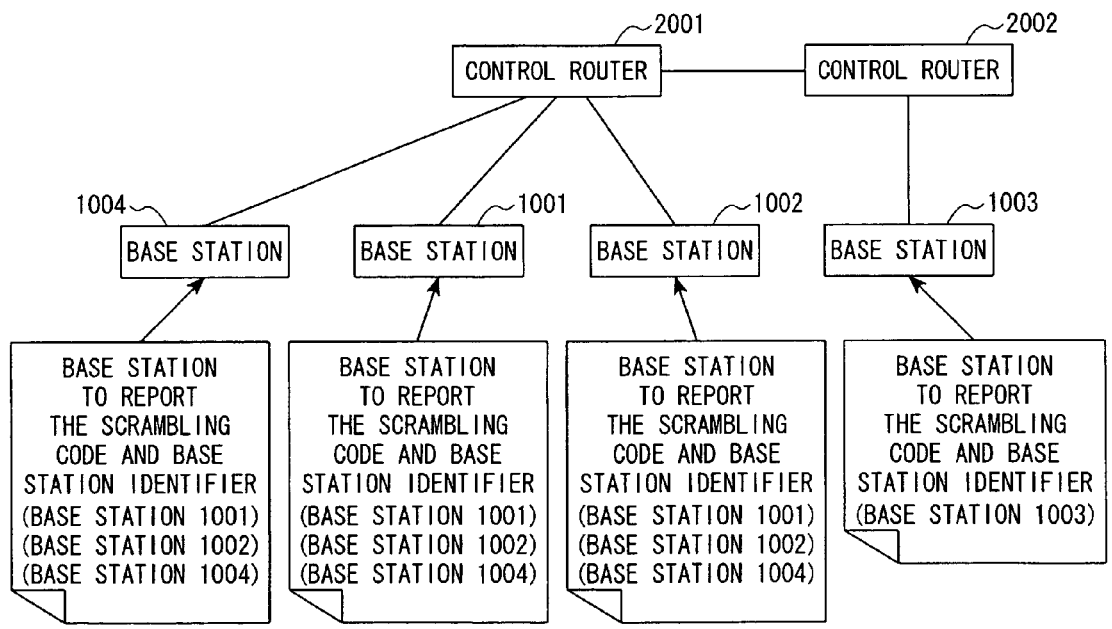

Referring to FIGS. 1A and 1B, a configuration example of a radio access network according to this embodiment will be described below. FIG. 1A shows a state before a base station is newly established, and FIG. 1B shows a state after the base station is newly established.

In the radio access network of this example, a CDMA (Code Division Multiple Access) cellular system is adopted in which a mobile station belonging to a cell and each base station forming the cell make the communication by sharing the same frequency band in a plurality of adjacent cells. This network comprises a base station 100*i* (i is the natural number) and a control router 200*k* (k is the natural number). In this example, the base stations 1001 to 1003 and the control routers 2001 and 2002 are provided in the network, as shown in FIGS. 1A and 1B. And the down scrambling code different for each base station forming the cell, namely, the spreading code used for transmission through the satellite downlink is set up. Also, for each base station forming the cell, a pair of base station identifier and scrambling code for the peripheral base station forming the cell located around the cell is set up, and reported to the mobile station belonging to the cell formed by the base station.

Referring to FIG. 1A, in this example, in the base station 1001, the base stations to report the scrambling code and the base station identifier are the base station 1002 and the base station 1001 (i.e., self station). In the base station 1002, the base stations to report the scrambling code and the base station identifier are the base station 1001 and the base station 1002 (i.e., self station). In the base station 1003, the base station to report the scrambling code and the base station identifier is the base station 1003 (i.e., self station alone).

The radio access network of this example may adopt a FDD (Frequency Division Duplex) or TDD (Time Division Duplex) method of the CDMA. Also, the radio access network according to this embodiment may be a TDMA (Time Division Multiple Access) cellular system or a FDMA (Frequency Division Multiple Access) cellular system, besides the CDMA (Code Division Multiple Access) cellular system.

Each of the base stations 1001, 1002 and 1003 is accommodated in any of the control routers 2001 and 2002. In this example, at first, the base stations 1001 and 1002 are accommodated in the control router 2001 and the base station 1003 is accommodated in the control router 2002, as shown in FIG. 1A. Thereafter, the base station 1004 is newly established and accommodated in the control router 2001, as shown in FIG. 1B. As a result, in the base station 1001, the base stations to report the scrambling code and the base station identifier are the base stations 1002, the base station 1004 and base station 1001 (i.e., self station) in this example, as shown in FIG. 1B. In the base station 1002, the base stations to report the scrambling code and the base station identifier are the base station 1001, the base stations 1004 and the base station 1002 (i.e., self station). In the base station 1003, the base station to report the scrambling code and the base station identifier is the base station 1003 (i.e., self station alone). In the base station 1004, the base stations to report the scrambling code and the base station identifier are the base stations 1001, the base station 1002 and the base station 1004 (i.e., self station).

The base stations 1001 to 1004 are interconnected through the control routers 200 in combinations of base stations. Also, the base station 100 holds a pair of base station identifier and scrambling code for the peripheral base station to which the self base station makes a report, in which its contents can be inquired from another base station.

The identifier of the base station 100*i* required to hold uniqueness in the entire system may be managed by providing a server, and inquired from the control router. For example, a server 400 for managing the identifier of each base station may be provided, and each base station 100*i* or the control router 200*k* may make access to the server 400 via the Internet 500 to make the inquiry, as shown in FIGS. 2A and 2B.

Figure 2A:
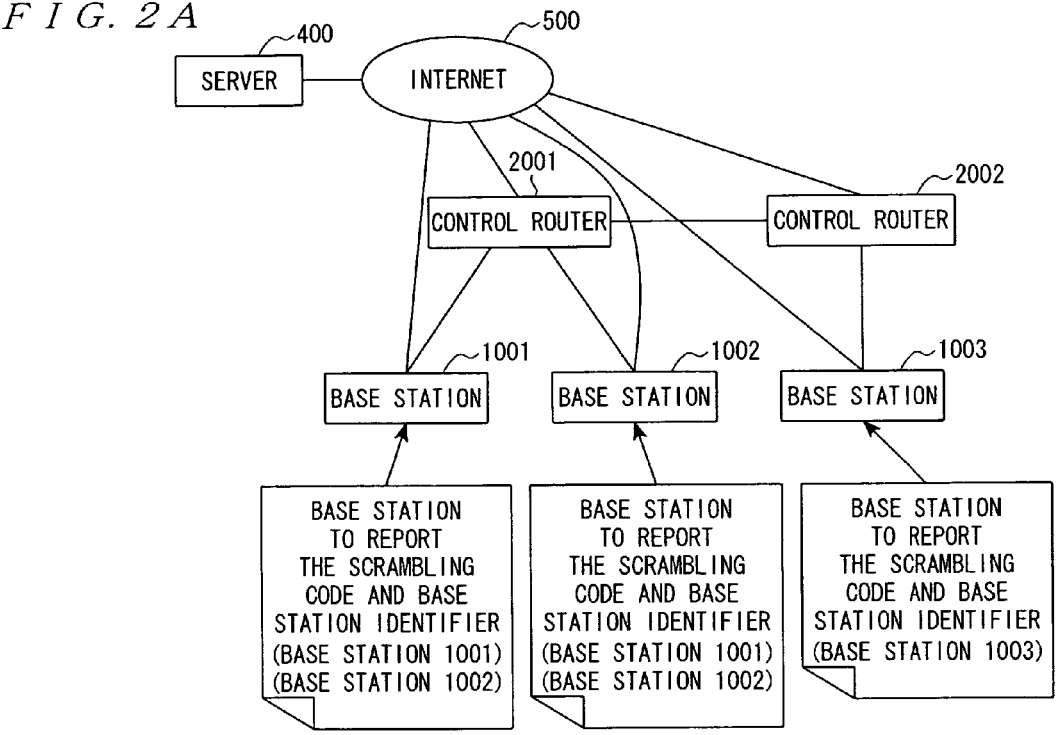
FIGS. 2A and 2B are views showing a configuration example in which a server for managing the identifier of each base station is added in the radio access network of FIGS. 1A and 1B.
Figure 2B:
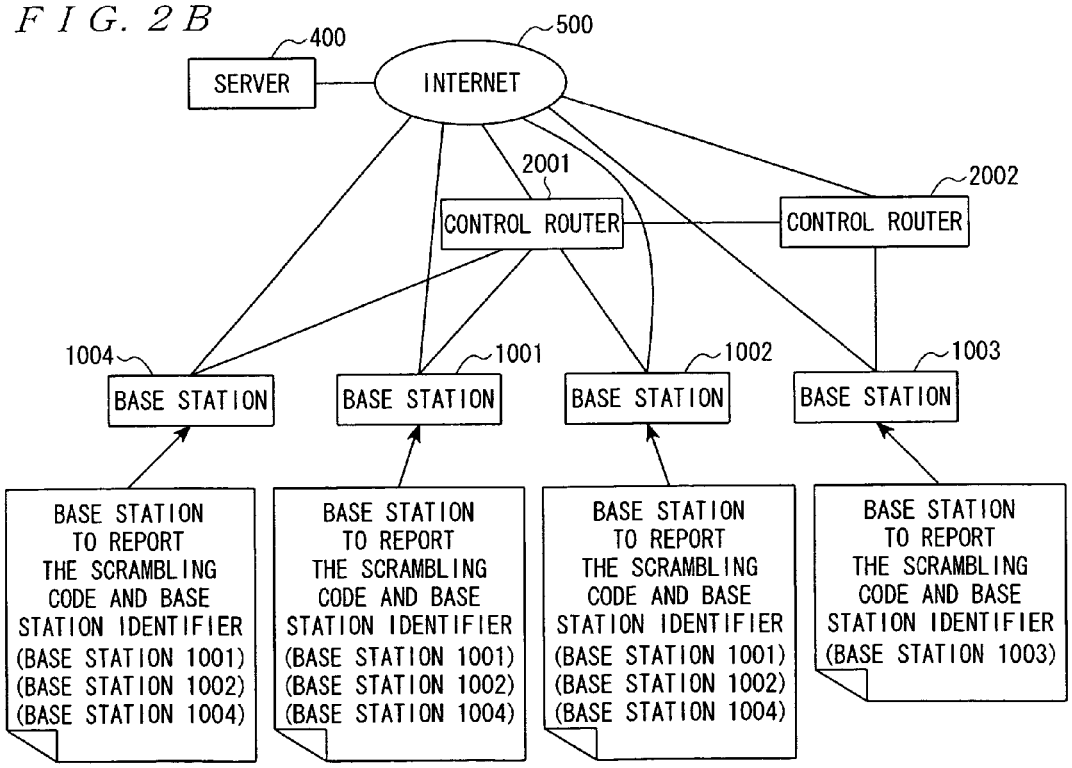

In FIGS. 2A and 2B, the server 400 is logically connected to the control router 200*k* and the base station 100*i*, but no hierarchical relationship between the control router and the base station may be employed in the node configuration. That is, when the base station identifier is transmitted or received between the server 400 and the base station 100*i*, the data transfer may occur without interposition of the control router 200*k*. Conversely, the base station identifier may be transmitted or received via the control router 200*k*.

The number of servers provided is not specifically limited. One server is provided in the entire system, as shown in FIGS. 2A and 2B, but a plurality of servers may be provided to distribute the load, for example.

While in FIGS. 1A, 1B, 2A and 2B, the base stations 1001, 1002 and 1004 are under the control router 2001, and the base station 1003 is under the control router 2002, they are not limited to such affiliated relation but may be in any other affiliated relation.

(Configuration Example of Base Station)

Figure 3:
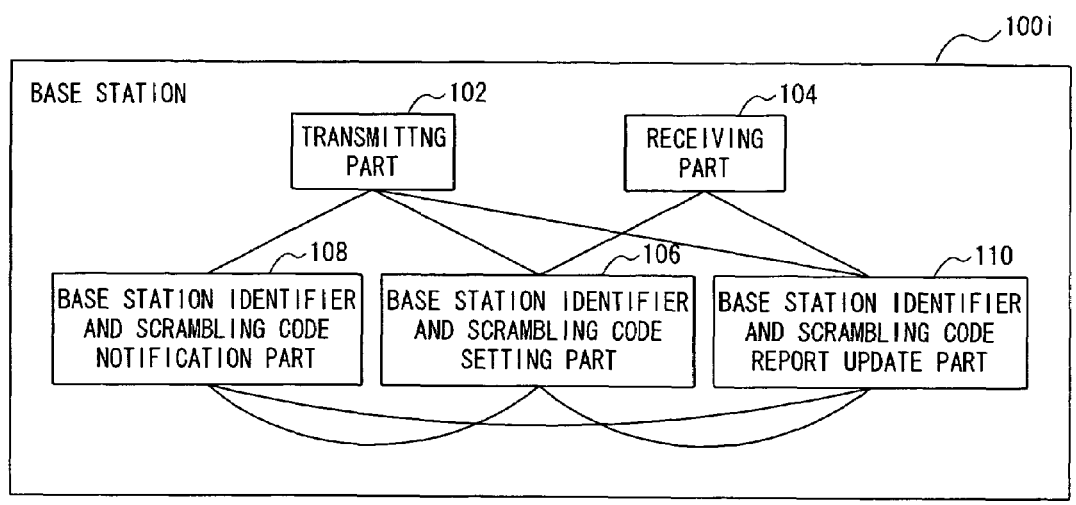
FIG. 3 is a block diagram showing the configuration of the base station according to the embodiment of the invention.

Referring to FIG. 3, a configuration example of the base station 100*i* in FIGS. 1A and 1B will be described below. In FIG. 3, the base station 100*i* of this example comprises a transmitting part 102 for transmitting various signals to the outside, a receiving part 104 for receiving various signals from the outside, a base station identifier and scrambling code setting part 106 connected to the transmitting part 102 and the receiving part 104, a base station identifier and scrambling code notification part 108 connected to the transmitting part 102 and the scrambling code setting part 106, and a base station identifier and scrambling code report update part 110 connected to the transmitting part 102, the receiving part 104, the scrambling code setting part 106 and the base station identifier and scrambling code notification part 108.

In this configuration, the setting contents of the identifier and the down scrambling code for the base station 100*i* are set up by the base station identifier and scrambling code setting part 106. The transmitting part 102 starts to transmit the base station identifier on the control channel spread by the down scrambling code.

The base station identifier and scrambling code notification part 108 transmits the base station identifier and the down scrambling code set in the self base station to another base station 100 via the transmitting part 102. Also, the receiving part 104 receives all the pairs of base station identifier and down scrambling code reported by the peripheral base station forming the cell located around the cell formed by the self base station and the path loss hold value in the pair of base station identifier and down scrambling code stored in the peripheral base station, and the base station identifier and scrambling code report update part 110 updates the pair of base station identifier and radio communication parameter reported to the mobile station belonging to the cell formed by the self base station.

(Configuration Example of Control Router)

Figure 4:
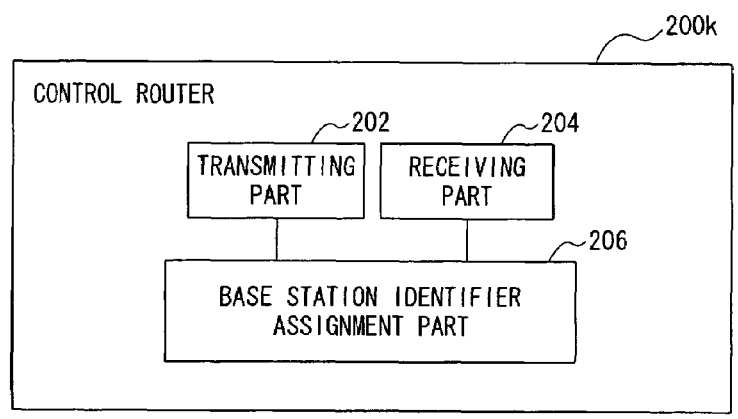
FIG. 4 is a block diagram showing the configuration of a control router according to the embodiment of the invention.

Referring to FIG. 4, a configuration example of the control router 200*k* of FIGS. 1A and 1B will be described below. In FIG. 4, the control router 200*k* of this example comprises a transmitting part 202 for transmitting various signals to the outside, a receiving part 204 for receiving various signals from the outside, and a base station identifier assignment part 206 connected to the transmitting part 202 and the receiving part 204.

In this configuration, the identifier of the newly established base station is transmitted from the server and received by the receiving part 204. The base station identifier assignment part 206 transmits the base station identifier to the newly established base station via the transmitting part 202.

(Communication of Signals Between Base Stations)

Figure 5:
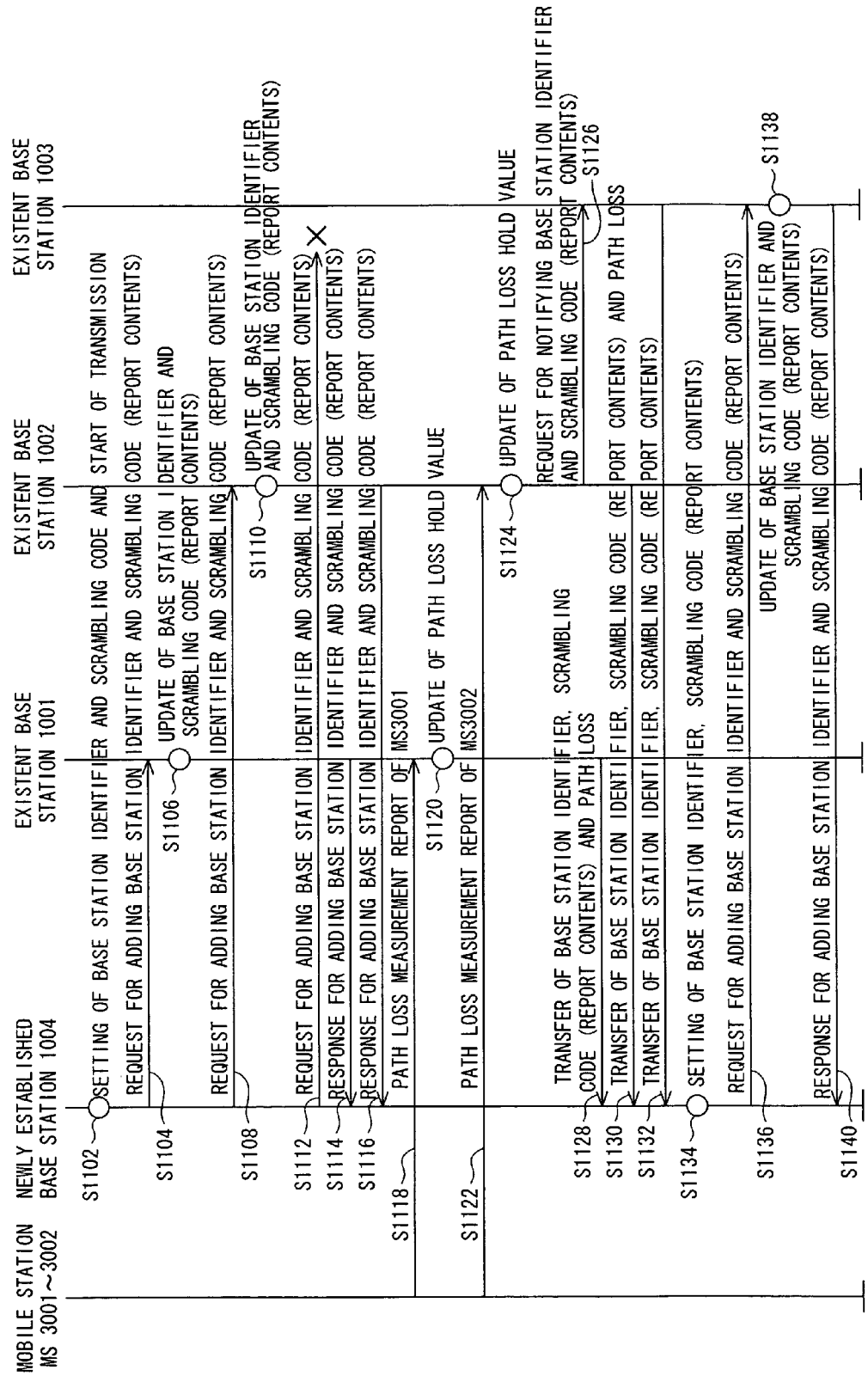
FIG. 5 is a sequence diagram showing a process for updating the base station identifier and the scrambling code reported by the newly established base station.

Referring to FIG. 5, the operation of automatically setting the pair of base station identifier and down scrambling code reported by the newly established base station after starting to transmit the identifier of the newly established base station on the control channel spread by the down scrambling code set by the newly established base station will be described below. In FIG. 5, communication of signals between the newly established base station 1004 and the existent base stations 1001 to 1003 is shown.

In FIG. 5, the newly established base station 1004 starts to transmit the identifier of the self station on a common control channel spread by the down scrambling code set in the self station (step S1102). Thereafter, the newly established base station 1004 makes a request to the existent base stations 1001 to 1003 to add the pair of base station identifier and down scrambling code for the newly established base station 1004 to the pair of base station identifier and down scrambling code reported by the existent base stations 1001 to 1003 (steps S1104, S1108 and S1112).

The existent base stations 1001 and 1002, which have been able to receive the request signal for adding the base station identifier and the scrambling code from the newly established base station 1004 under the condition of at least one of within a certain required time and within a certain number of router relays, adds the pair of base station identifier and down scrambling code for the newly established base station 1004 to the pair of base station identifier and down scrambling code reported by the self base station 1004 (steps S1106 and S1110). On the other hand, the existent base station 1003 that has not been able to receive the request under the above condition does not add the pair of base station identifier and down scrambling code for the newly established base station 1004 (step S1112).

The existent base stations 1001 and 1002 that have added the pair of base station identifier and down scrambling code for the newly established base station 1004 to the pair of base station identifier and down scrambling code reported returns a response to the request for adding the base station identifier and the scrambling code from the newly established base station 1004 (steps S1114 and S1116).

The mobile stations (Mobile Station: MS) 3001 and 3002 that are receivable on the common control channel for the newly established base station 1004 newly identify the down scrambling code and the base station identifier for the newly established base station 1004, and notify a measurement report of the path loss for the pairs of base station identifier and down scrambling code for the existent base stations 1001 and 1002 and the newly established base station 1004, to which the mobile station belongs, to the affiliated existent base stations 1001 and 1002, and the existent base station 1001 and 1002 receive this report (steps S1118 and S1122). The existent base stations 1001 and 1002 update the path loss hold value held in the existent base stations 1001 and 1002, based on the measurement report of the path loss (steps S1120 and S1124).

If the measurement report of the mobile station (Mobile Station: MS) 3002 includes the path loss for the pair of base station identifier and down scrambling code for the existent base station 1003, in addition to the existent base station 1002 and the newly established base station 1004 to which the mobile station belongs, the existent base station 1002 receiving this measurement report makes a request to the existent base station 1003 to notify all the pairs of base station identifier and down scrambling code reported by the existent base station 1003 to the newly established base station 1004 (step S1126).

Herein, the existent base station makes a request to the newly established base station to notify the measurement report to the other existent base station, if the measurement report includes the path loss for the pair of base station identifier and down scrambling code for the other existent base station, in addition to the self station and the newly established base station. However, if only the path losses for the self station and the newly established base station are included (i.e., the path loss for the other existent base station is not included), no notification request is made. In this example, the existent base station 1002 has received the measurement report including the path loss for the pair of base station identifier and down scrambling code for the existent base station 1003, in addition to the self station and the newly established base station. On the contrary, the existent base station 1001 has received the measurement report including only the path losses for the self station and the newly established base station, whereby the existent base station 1002 alone issues a notification request to the existent base station 1003.

The existent base stations 1001 and 1002 receiving the measurement report of the path loss from the mobile stations MS3001 and 3002 transfer all the pairs of base station identifier and down scrambling code reported by the self base station and the path loss hold values in those pairs to the newly established base station 1004 (steps S1128 and S1130).

The existent base station 1003 receiving the request from the existent base station 1002 to notify the pair of base station identifier and down scrambling code reported by the existent base station 1003 to the newly established base station 1004 transfers the pair of base station identifier and down scrambling code reported by the self base station to the newly established base station 1004 (step S1132).

The scrambling code setting part 106 of the newly established base station 1004 sets the pair of base station identifier and down scrambling code reported by the newly established base station 1004 by referring to all the transferred pairs of base station identifier and down scrambling code reported by the existent base stations 1001 and 1002 with the path loss hold values corresponding to those pairs and all the pairs of base station identifier and down scrambling code reported by the existent base station 1003 (step S1134).

Also, the newly established base station 1004 makes a request to the existent base station 1003 to add the pair of base station identifier and down scrambling code for the newly established base station 1004, the existent base station 1003, among the existent base stations 1001 to 1003 corresponding to all the pairs of base station identifier and down scrambling code reported by the self base station, having not yet added the pair of base station identifier and scrambling code for the newly established base station 1004 as the pair of base station identifier and scrambling code to report (step S1136). The existent base station 1003 receiving this request adds the pair of base station identifier and down scrambling code for the newly established base station 1004 to the pair of base station identifier and down scrambling code reported by the self base station (step S1138). And the existent base station 1003 makes a notification of completion of adding the pair of base station identifier and down scrambling code fore the newly established base station 1004 to the newly established base station 1004 (step S1140).

In the above manner, when the reporting radio communication parameter for the newly established station is setup, the parameter is updated based on the path loss measured value of the peripheral base station notified from the mobile station and the reporting radio communication parameter of the peripheral base station, whereby the parameter can be updated at higher precision.

(Configuration Example of Mobile Station)

Figure 6:
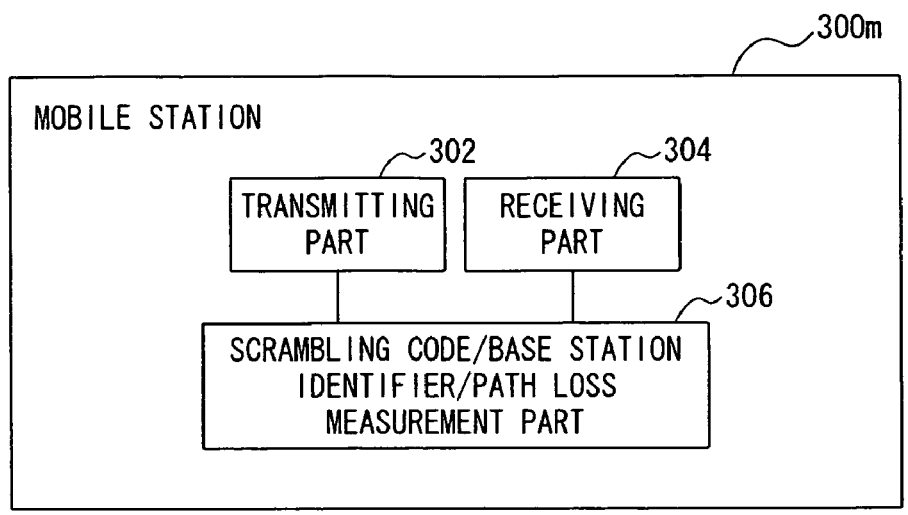
FIG. 6 is a block diagram showing the configuration of a mobile station according to the embodiment of the invention.

Referring to FIG. 6, a configuration example of the mobile station 300m (m is the natural number) will be described below. In FIG. 6, the mobile station 300m comprises a transmitting part 302 for transmitting various signals to the outside, a receiving part 304 for receiving various signals from the outside, and a scrambling code/base station identifier/path loss measurement part 306 connected to the transmitting part 302 and the receiving part 304. This mobile station is the mobile terminal equipment such as a cellular phone, a PDA (Personal Digital Assistant) or a notebook type computer.

The scrambling code/base station identifier/path loss measurement part 306 reports the identifier of the base station 100i and the down scrambling code of the base station 100i to the existent base station 100i via the transmitting part 302. Also, the scrambling code/base station identifier/path loss measurement part 306 measures a difference (i.e., path loss) between the transmission power of the base stations 100i and the reception power of the mobile station and reports it to the existent base station 100i via the transmitting part 302.

The scrambling code/base station identifier/path loss measurement part 306 of the mobile station 300m reports the identifier, the down scrambling code and the path loss for the base station that could be measured at the same time, other than the base stations 1001 to 1003 and the newly established base station 1004, to which the measurement report is addressed. However, for the convenience's sake of explanation, it is supposed that the path loss with only the base stations 1001 to 1003 and the newly established base station 1004 to which the measurement report is addressed can be measured.

(Example of Measurement Report)

Figure 7:
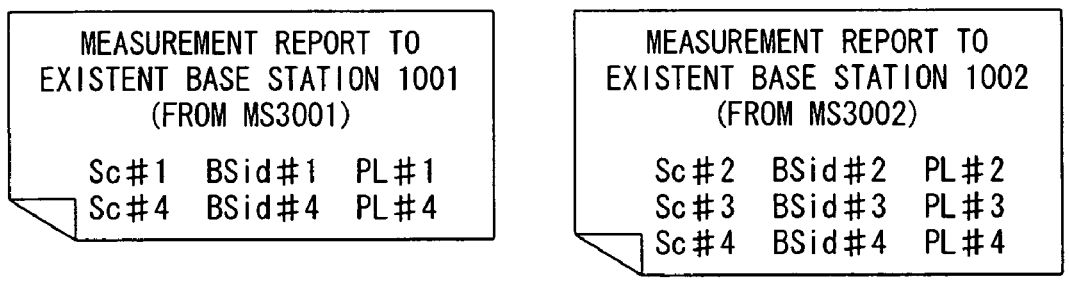
FIG. 7 is a view showing the information reported from the mobile station to the base station.

Referring to FIG. 7, the information (measurement report) reported from the mobile station 300 to the base station 100 will be described below.

As shown in FIG. 7, the scrambling code/base station identifier/path loss measurement part 306 of the mobile station MS3001 transmits the path loss "PL#1" in the pair of down scrambling code "Sc#1 and base station identifier "BSid#1" for the base station 1001 at the destination and the path loss "PL#4" in the pair of down scrambling code "Sc#4 and base station identifier "BSid#4" for the newly established base station 1004, as the measurement report, to the existent base station 1001.

Also, the scrambling code/base station identifier/path loss measurement part 306 of the mobile station MS3002 transmits the path loss "PL#2" in the pair of down scrambling code "Sc#2 and base station identifier "BSid#2" for the base station 1002 at the destination and the path loss "PL#4" in the pair of down scrambling code "Sc#4 and base station identifier "BSid#4" for the newly established base station 1004, as the measurement report, to the existent base station 1002. Further, in the mobile station MS3002, the path loss "PL#3" in the pair of down scrambling code "Sc#3 and base station identifier "BSid#3" for the base station 1003 connectable in addition to the base station 1002 and the newly established base station 1004 is transmitted as the measurement report.

The scrambling code/base station identifier/path loss measurement part 306 of the mobile station MS300m may report the reception level and the arrival time difference of the control channel, other than the identifier, the down scrambling code and the path loss for the base station.

(Method for Transmitting Information to Newly Established Base Station)

Figure 8:
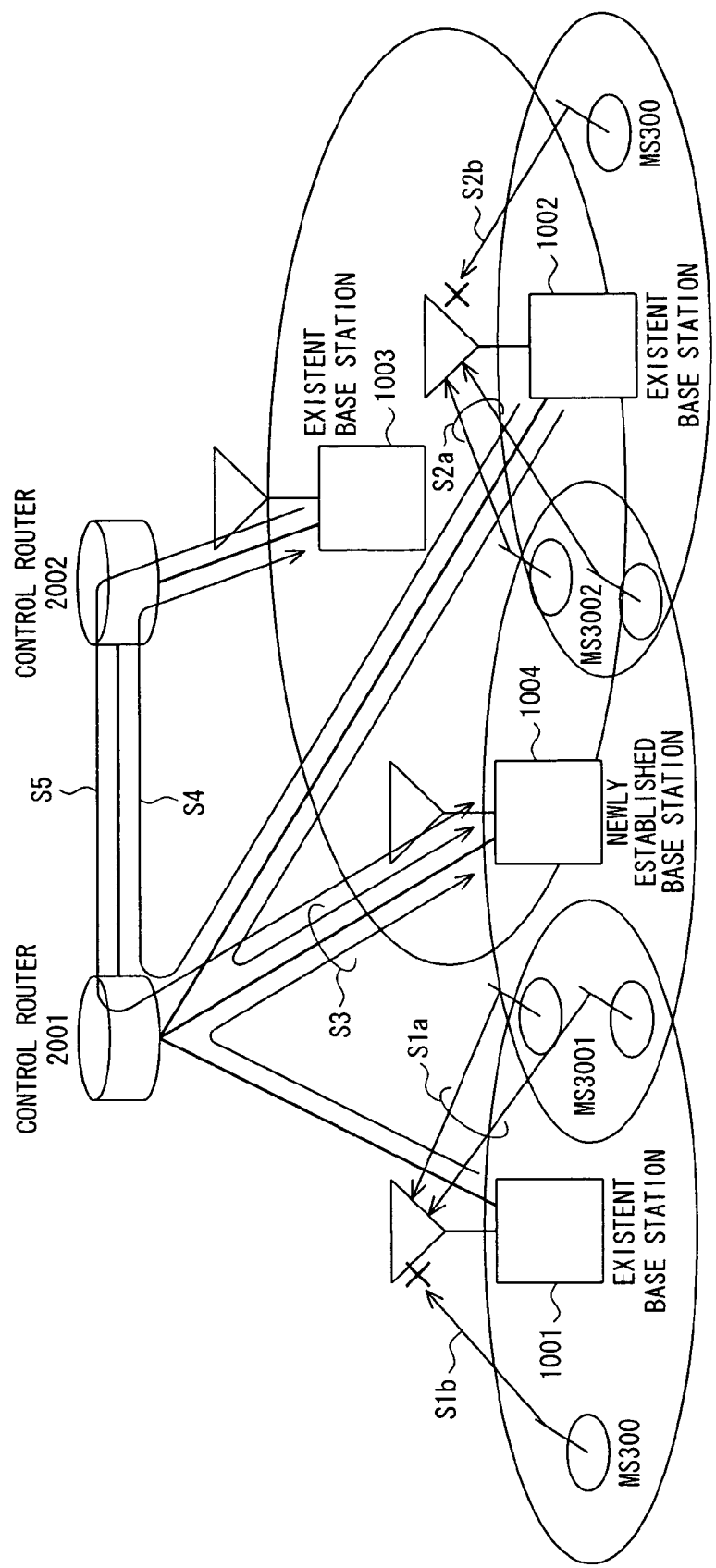
FIG. 8 is a view showing how the base station identifier, scrambling code and path loss hold value reported by the existent base station are notified to the newly established base station.

Referring to FIG. 8, a method for allowing the base stations 1001 to 1003 to transmit all the pairs of base station identifier and down scrambling code reported by the existent base stations 1001 and 1002 with the path loss hold values in those pairs and all the pairs of base station identifier and down scrambling code reported by the base station 1003 to the newly established base station 1004 will be described below.

In FIG. 8, the existent base stations 1001 and 1002 update the path loss hold value in each pair of base station identifier and down scrambling code, only if the path loss in the pair of base station identifier and down scrambling code in the newly established base station 1004, in addition to the existent base stations 1001 and 1002 being connected, is included in the reception report of the path loss received from the mobile station 300m belonging to the cell formed by the self base station. For example, the existent base station 1001 updates the path loss hold value for the measurement report acquired from the mobile station 3001 in FIG. 8 (S1a). On the other hand, the measured report (× sign in FIG. 8) that could not be acquired is not subject to updating the path loss hold value (S1b). The existent base station 1002 likewise updates the path loss hold value for the measurement report acquired from the mobile station 3002 in FIG. 8 (S2a), and the measurement report (× sign in FIG. 8) that could not be acquired is not subject to updating the path loss hold value (S2b). The path loss hold value may be updated based on the average value or minimum value of the path loss measured values received up to the present time in each pair of base station identifier and down scrambling code.

If the existent base stations 1001 and 1002 receive a certain number of path loss measurement reports subject to updating the path loss hold value, an update process for the path loss hold value is ended. And the existent base stations 1001 and 1002 notify all the pairs of base station identifier and down scrambling code reported by the existent base stations 1001 and 1002 and the path loss hold values in those pairs to the newly established base station 1004. This notification is transmitted via the control router 2001 to the newly established base station 1004 (S3).

Also, if the existent base stations 1001 and 1002 store the path loss hold value in the pair of base station identifier and down scrambling code other than the self base station and the newly established base station 1004, they make a request to the existent base station 1003 corresponding to the pair of base station identifier and down scrambling code to transmit all the pairs of base station identifier and down scrambling code reported by the existent base stations 1003 to the newly established base station 1004 (S4). Based on this request, the existent base station 1003 transmits all the pairs of base station identifier and down scrambling code reported by the self base station to the newly established base station 1004 (S5).

In the newly established base station 1004, the base station identifier and scrambling code report update part 110 sets the pair of base station identifier and down scrambling code reported by the newly established base station 1004 to the self station, based on all the notified pairs of base station identifier and down scrambling code reported by the base stations 1001 and 1002 with the path loss hold values in those pairs, and all the pairs of base station identifier and down scrambling code reported by the base station 1003.

(Example of Pair of Base Station Identifier and Down Scrambling Code)

Figure 9:
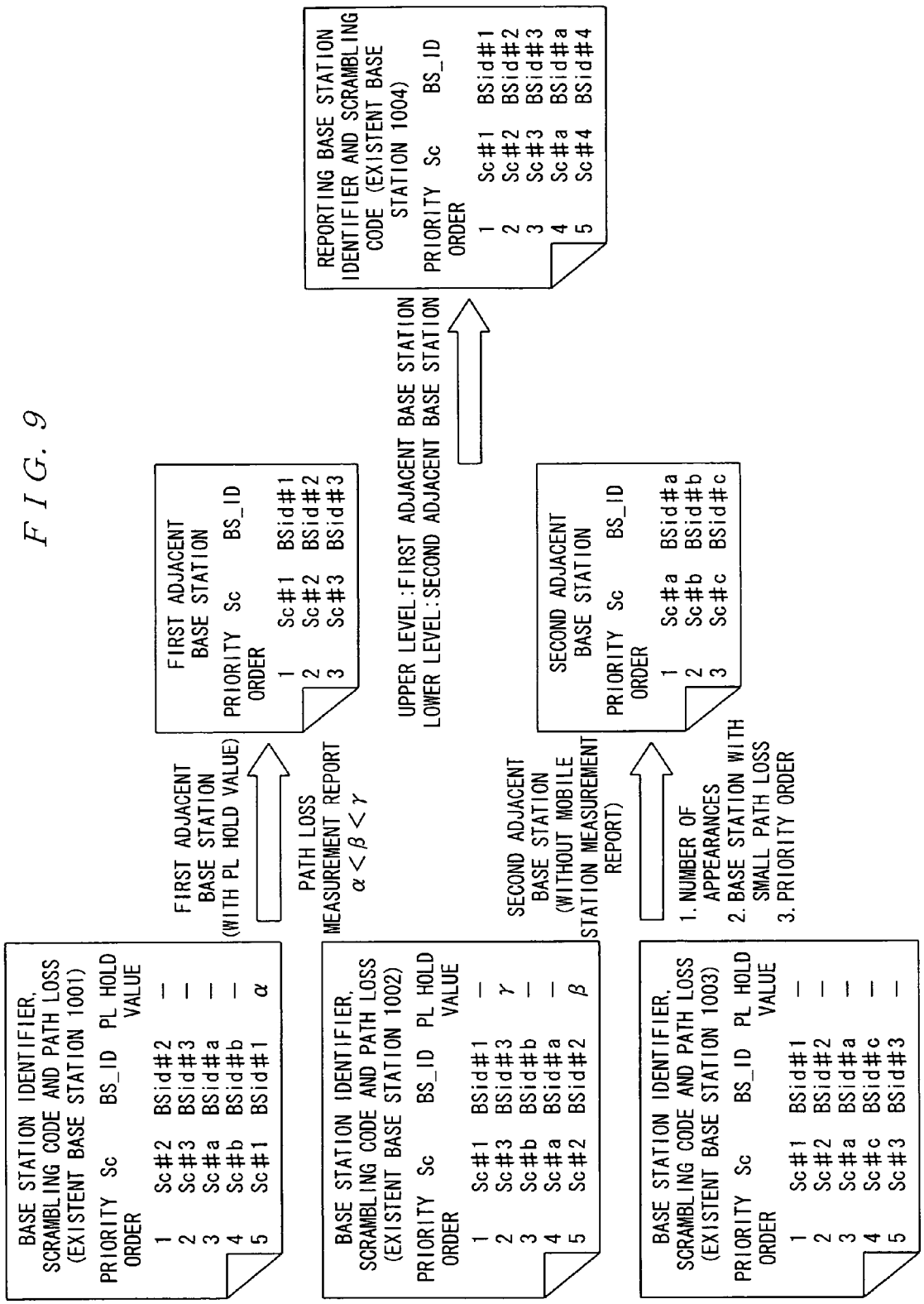
FIG. 9 is a view showing a process for setting the base station identifier and the scrambling code reported by the newly established base station based on the base station identifier, the scrambling code and the path loss reported by the peripheral base station.

FIG. 9 is a view showing the examples of the pair of base station identifier and down scrambling code reported by the newly established base station 1004, which are generated in the base station identifier and scrambling code report update part 110.

Referring to FIG. 9, in the existent base station 1001, the pair of down scrambling code "Sc#2" and base station identifier "BSid#2", the pair of "Sc#3" and "BSid#3", the pair of "Sc#a" and "BSid#a", the pair of "Sc#b" and "BSid#b" and the pair of "Sc#1" and "BSid#1" with the path loss (PL) hold value "α" are set up in the descending order of priority.

Also, in the existent base station 1002, the pair of down scrambling code "Sc#1" and base station identifier "BSid#1", the pair of "Sc#3" and "BSid#3" with the path loss (PL) hold value "γ", the pair of "Sc#b" and "BSid#b", the pair of "Sc#a" and "BSid#a" and the pair of "Sc#2" and "BSid#2" with the path loss (PL) hold value "β" are set up in the descending order of priority.

Further, in the existent base station 1003, the pair of down scrambling code "Sc#1" and base station identifier "BSid#1", the pair of "Sc#2" and "BSid#2", the pair of "Sc#a" and "BSid#a", the pair of "Sc#c" and "BSid#c" and the pair of "Sc#3" and "BSid#3" are set up in the descending order of priority.

In the above set-up states, the setting contents for the base station 1004 are decided in the following manner. That is, at the top level of the priority order for the pair of base station identifier and down scrambling code, the pair of base station identifier and down scrambling code are set for the adjacent base station (hereinafter referred to as a first adjacent base station), to which the path loss hold value is notified, among all the pairs of base station identifier and down scrambling code reported by the existent base stations 1001 to 1003. At its lower level, the pair of base station identifier and down scrambling code for the adjacent base station (hereinafter referred to as a second adjacent base station), to which the path loss hold value is not notified, is set up. In this example, the base stations 1001 and 1002 are the "first adjacent base stations" and the base station 1003 is the "second adjacent base station".

Herein, for the priority order between the first adjacent base stations, the first adjacent base station having the smaller path loss hold value notified from the existent base stations 1001 and 1002 is placed at higher level. In this example, the path loss values in the measurement report are "α", "β" and "γ" in the ascending order of value. If the path loss hold values for the pair of down scrambling code and base station identifier at the same first adjacent base station are received from a plurality of base stations 100, the average value or minimum value of path loss hold values may be employed and compared with the path loss hold value of the other first adjacent base station.

Also, for the priority order between the second adjacent base stations, the second adjacent base station having the greater number appearances among the pairs of base station identifier and down scrambling code reported by the first adjacent base station is placed at higher level. If the second adjacent base stations have the same number of appearances, the second adjacent base station with smaller path loss value of the measurement report in the pair of base station identifier and down scrambling code reported by the first adjacent base station is placed at higher level. Further, if the second adjacent base stations have smaller path loss value of the measurement report in the pair of base station identifier and down scrambling code reported by the same first adjacent base station, the second adjacent base station with higher priority order among the pairs of base station identifier and down scrambling code reported by the first adjacent base station with smaller path loss value of the measurement report is placed at higher level. That is, the setting sequence is decided in the sequence of the "number of appearances", "base station with smaller path loss value" and "priority order". Finally, the base station identifier and down scrambling code for the newly established base station 1004 are set as the pair of base station identifier and down scrambling code reported by that base station.

In the above manner, in the newly established base station 1004, the pair of down scrambling code "Sc#1" and base station identifier "BSid#1", the pair of "Sc#2" and "BSid#2", the pair of "Sc#3" and "BSid#3", the pair of "Sc#a" and "BSid#a" and the pair of "Sc#4" and "BSid#4" are set up in the descending order of priority.

By the way, the number of pairs of base station identifier and down scrambling code reported by the base station 100 is limited. Therefore, if the set number of pairs of base station identifier and down scrambling code exceeds an upper limit value ("5" in this example), the base station identifier and scrambling code report update part 110 deletes the terms having lower priority order while the term of the down scrambling code and identifier for the self base station is left. And if this upper limit value is exceeded, a setting process for the pair of base station identifier and down scrambling code is completed.

With this embodiment, in the case where the pair of base station identifier and down scrambling code reported by the newly established base station is set up, if more than one pair of scrambling code and base station identifier with the same number of appearances exists among the pairs of base station identifier and down scrambling code reported at a plurality of base stations located adjacent to the cell formed by the newly established base station, the pair of base station identifier and down scrambling code reported by the newly established base station can be set up by giving the priority level to the pair of scrambling code and base station identifier.

(Variant Example)

While in the above embodiment, the down scrambling code not overlapping the down scrambling code of another base station is set in the CDMA system, the invention may be applied to the TDMA system or FDMA system. That is, the radio communication parameter can be set up for the pair of time slot and base station identifier reported by the newly established base station in the TDMA cellular system, or the pair of frequency band and base station identifier reported by the newly established base station in the FDMS cellular system.

The invention is applicable to a multiple access system for allowing a plurality of users to make the communications at the same time by sharing a radio channel.

What is claimed is:

1. A base station apparatus, comprising:
radio communication parameter notification means for notifying a pair of an identifier for identifying the base station apparatus and a radio communication parameter for identifying the base station apparatus to another base station in the neighborhood of the base station apparatus;

information acquisition means for acquiring information about at least one of a path loss value, a reception level and an arrival time difference over a control channel, and also acquiring another pair of another identifier for identifying said another base station apparatus and another radio communication parameter for identifying said another base station apparatus, the path loss value being a difference between a transmission power of said another base station apparatus and a reception power of a mobile station; and radio communication report parameter update means for setting and updating the pair of the identifier and the radio communication parameter to be reported by the base station apparatus, based on the information acquired by said information acquisition means;

wherein said radio communication report parameter update means sets a pair, having a smaller preset path lost value, out of the pairs of the identifiers and the radio communications parameters, as a preferentially reported pair, and if the path loss values of the pairs are equal, said radio communication report parameter update means sets a pair having a greater number of appearances as the preferentially reported pair.

2. A base station apparatus, comprising:

radio communication parameter notification means for notifying a pair of an identifier for identifying the base station apparatus and a radio communication parameter for identifying the base station apparatus to another base station in the neighborhood of the base station apparatus;

information acquisition means for acquiring information about at least one of a path loss value, a reception level and an arrival time difference over a control channel, and also acquiring another pair of another identifier for identifying said another base station apparatus and another radio communication parameter for identifying said another base station apparatus, the path loss value being a difference between a transmission power of said another base station apparatus and a reception power of a mobile station; and radio communication report parameter update means for setting and updating the pair of the identifier and the radio communication parameter to be reported by the base station apparatus, based on the information acquired by said information acquisition means;

wherein said radio communication report parameter update means sets a pair, having a smaller preset path lost value, out of the pairs of the identifiers and the radio communications parameters, as a preferentially reported pair, and if the numbers of appearances are equal, said radio communication report parameter update means sets a pair having a smaller preset path loss value as the preferentially reported pair.

3. A base station apparatus, comprising:

information acquisition means for acquiring, from a newly established base station apparatus that is a second base station apparatus, information about at least one of a path loss value, a reception level and an arrival time difference over a control channel, and also acquiring second information about a second pair of a second identifier for identifying the second base station apparatus and a second radio communication parameter for identifying the second base station apparatus, the path loss value being a difference between a transmission power of the second base station apparatus and a reception power of a mobile station;

radio communication parameter report means for reporting the second information acquired by said information acquisition means together with a first pair of a first identifier for identifying the first base station apparatus and a first radio communication parameter for identifying the first base station apparatus to a mobile station belonging to a cell formed by the first base station apparatus;

path loss update means for updating a path loss value in said first pair of the first identifier and the first radio communication parameter based on a measurement report, only when the measurement report, including path loss values of the first pair of the first identifier and the first radio communication parameter and the second pair of the second identifier and the second radio communication parameter, is acquired from said mobile station, and path loss notification means for transmitting the path loss value in the first pair of the first identifier and the first radio communication parameter reported by the first base station apparatus to the second base station apparatus, when said measurement report is acquired;

wherein said path loss update means sets any one of an average value of measurements of said path loss value and a minimum value of said measurements an update value of said path loss value, when said measurement reports are acquired from a plurality of mobile stations.

4. A base station apparatus, comprising:

information acquisition means for acquiring, from a newly established base station apparatus that is a second base station apparatus, information about at least one of a path loss value, a reception level and an arrival time difference over a control channel, and also acquiring second information about a second pair of a second identifier for identifying the second base station apparatus and a second radio communication parameter for identifying the second base station apparatus, the path loss value being a difference between a transmission power of the second base station apparatus and a reception power of a mobile station;

radio communication parameter report means for reporting the second information acquired by said information acquisition means together with a first pair of a first identifier for identifying the first base station apparatus and a first radio communication parameter for identifying the first base station apparatus to a mobile station belonging to a cell formed by the first base station apparatus;

path loss update means for updating a path loss value in said first pair of the first identifier and the first radio communication parameter based on a measurement report, only when the measurement report, including path loss values of the first pair of the first identifier and the first radio communication parameter and the second pair of the second identifier and the second radio communication parameter, is acquired from said mobile station; and path loss notification means for transmitting the path loss value in the first pair of the first identifier and the first radio communication parameter reported by the first base station apparatus to the second base station apparatus, when said measurement report is acquired;

wherein said path loss notification means transmits the path loss value in the first pair of the first identifier and the first radio communication parameter that have been reported by the first base station apparatus to said second base station apparatus, when said measurement reports are acquired from a predetermined number of mobile stations.

5. A base station apparatus according to claim 3 or claim 4, further comprising:

radio communication report parameter notification response means for notifying to a newly established base station apparatus that is a second base station apparatus all pairs of identifiers and radio communication parameters that have been reported by the first base station apparatus when another base station apparatus that is a third base station apparatus other than the first and second base station apparatuses makes a request for notifying all the pairs to said second base station apparatus.

6. A mobile station apparatus configured to communicate with the base station apparatus according to any one of claims 1, 2, 3 and 4, the mobile station apparatus comprising:

path loss measurement means for measuring a path loss value that is a power difference between the transmission power of a base station apparatus to which the mobile station apparatus can be connected and the reception power of the mobile station apparatus; and notification means for notifying the path loss value measured by said path loss measurement means to said base station apparatus.

7. A radio communication parameter updating method, comprising:

notifying a pair of an identifier for identifying a base station apparatus and a radio communication parameter for identifying the base station apparatus to another base station apparatus in the neighborhood of the base station apparatus;

acquiring information about at least one of a path loss value, a reception level and an arrival time difference over a control channel, and also acquiring another pair of another identifier for identifying said another base station apparatus and another radio communication parameter for identifying said another base station apparatus, the path loss value being the difference between a transmission power of said another base station apparatus and a reception power of a mobile station; and setting and updating the pair of the identifier and the radio communication parameter to be reported by the base station apparatus, based on the information acquired, wherein the setting and updating step sets a pair, having a smaller preset path lost value, out of the pairs of the identifiers and the radio communication parameters, as a preferentially reporting pair, and if the path loss values of the pairs are equal, the setting and updating step sets a pair having a greater number of appearances, as the preferentially reported pair.

8. A radio communication parameter updating method applied to a radio communication system having a base station apparatus that is a first base station apparatus, the method comprising:

acquiring, from a newly established base station apparatus that is a second base station apparatus, information about at least one of a path loss value, a reception level and an arrival time difference over a control channel, and also acquiring second information about a second pair of a second identifier for identifying the second base station apparatus and a second radio communication parameter for identifying the second base station apparatus, the path loss value being the difference between a transmission power of the second base station apparatus and a reception power of a mobile station;

reporting the second information acquired together with a first pair of a first identifier for identifying the first base station apparatus and a first radio communication parameter for identifying the first base station apparatus, to a mobile station belonging to a cell formed by the first base station apparatus;

updating a path loss value in said first pair of first identifier and the first radio communication parameter based on a measurement report, only when the measurement report, including path loss values of the first pair of the first identifier and the first radio communication parameter and the second pair of the second identifier and the second radio communication parameter, is acquired from the mobile station; and transmitting the path loss value in the first pair of the first identifier and the first radio communication parameter reported by the first base station apparatus to the second base station apparatus, when said measurement report is acquired, wherein the updating step sets any one of an average value of measurements of said path loss value and a minimum value of said measurements to an update value of said path loss value, when said measurement reports are acquired from a plurality of mobile stations.

9. The base station apparatus according to claim 3 or claim 4, further comprising:

radio communication report parameter notification request means for making a request to another base station apparatus that is a third base station apparatus other than the first and second base station apparatuses, to notify to the second base station apparatus all pairs of identifiers and radio communication parameters reported by said third base station apparatus, when a path loss value in a third pair of a third identifier for indicating the third base station apparatus and a third radio communication parameter for indicating the third base station apparatus are acquired from said mobile station.

10. A radio communication parameter updating method comprising:

notifying a pair of an identifier for identifying a base station apparatus and a radio communication parameter for identifying the base station apparatus to another base station apparatus in the neighborhood of the base station apparatus;

acquiring information about at least one of a path loss value, a reception level and an arrival time difference over a control channel, and also acquiring another pair of another identifier for identifying said another base station apparatus and another radio communication parameter for identifying said another base station apparatus, the path loss value being a difference between a transmission power of said another base station apparatus and reception power of a mobile station; and setting and updating the air of the identifier and the radio communication parameter to be reported by the base station apparatus, based on the information acquired;

wherein the setting and updating step sets a pair, having a greater number of appearances, out of the pairs of the identifiers and the radio communication parameters, as a preferentially reported pair, and if the numbers of appearance are equal, the setting and updating step sets a pair having a smaller preset path loss value, as the preferentially reported pair.

11. A radio communication parameter updating method applied to a radio communication system having a base station apparatus that is a first base station apparatus, the method comprising:

acquiring, from a newly established base station apparatus that is a second base station apparatus, information about at least one of a path loss value, a reception level and an arrival time difference over a control channel, and also acquiring second information about a second pair of a second identifier for identifying the second base station apparatus and a second radio communication parameter for identifying the second base station apparatus, the path loss value being a difference between a transmission power of the second base station apparatus and a reception power of a mobile station;

reporting the second information acquired together with a first pair of a first identifier for identifying the first base station apparatus and a first radio communication parameter for identifying the first base station apparatus, to a mobile station belonging to a cell formed by the first base station apparatus;

updating a path loss value in said first pair of the first identifier and the first radio communication parameter based on a measurement report, only when the measurement report, including path loss values of the first pair of first identifier and the first radio communication parameter and the second pair of the second identifier and the second radio communication parameter, is acquired from the mobile station; and transmitting the path loss value in the first pair of the first identifier and the first radio communication parameter reported by the first base station apparatus to the second base station apparatus, when said measurement report is acquired;

wherein the transmitting step transmits the path loss value in the first pair of the first identifier and the first radio communication parameter that have been reported by the first base station apparatus to said second base station apparatus, when said measurement reports are acquired from a predetermined number of mobile stations.

* * * * *